Figure 1:
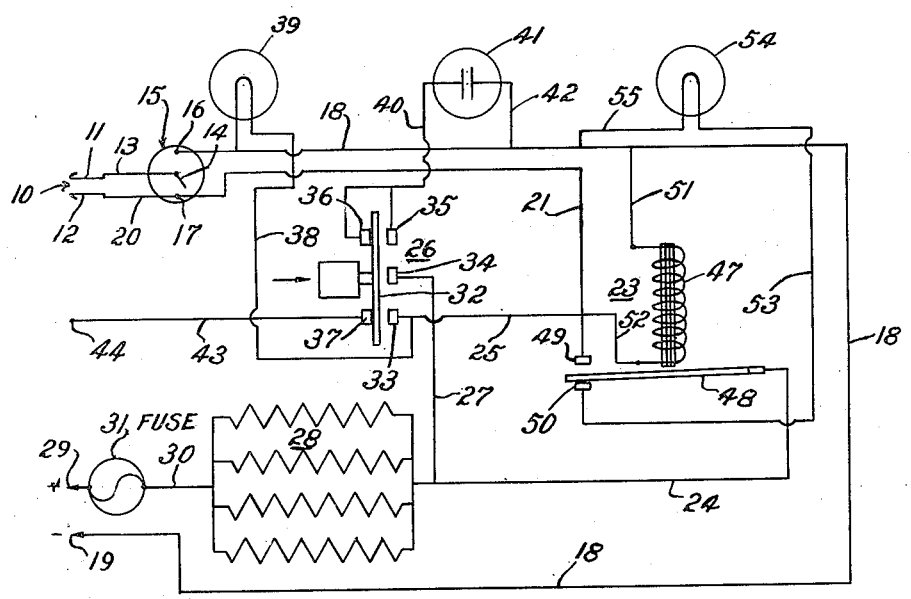

June 8, 1948.   J. H. KIRKPATRICK, JR   2,442,771

TESTING DEVICE FOR ELECTRIC TOOLS AND APPLIANCES

Filed March 10, 1945

INVENTOR.
JOSEPH H KIRKPATRICK, JR.
BY
Ralph L. Chappell
ATTORNEY.

Patented June 8, 1948

2,442,771

UNITED STATES PATENT OFFICE 2,442,771

TESTING DEVICE FOR ELECTRIC TOOLS AND APPLIANCES

Joseph H. Kirkpatrick, Jr., Darby, Pa.

Application March 10, 1945, Serial No. 582,094

2 Claims. (Cl. 175—183)

(Granted under the act of March 3, 1883, as amended April 30, 1928; 370 O. G. 757)

This invention relates to new and useful improvements in testing devices, and more particularly to devices for detecting grounds and short circuits in the motors and cords of portable electric tools and appliances such as drills, grinders and the like.

In modern industrial plants it is the general practice to keep small portable electric tools and appliances in a centrally located tool "bin" or room where they can be obtained from the storekeeper by the workmen in the plant or shop as desired or needed in their work. Such tools and appliances are used extensively and are subjected to considerable wear and tear with the result that the motors or current supply cords may become shorted or there may develop a current leak to the metal tool or casing structure of the appliance thereby causing the tool or appliance to be electrically grounded when brought into contact with metal work. A considerable number of man hours working time is lost over a period of time by workmen going to the tool room, obtaining the desired tool or appliance, and returning with it to their work station only to find that the tool or appliance is inoperative or not useable because of a short circuit or ground leak therein thereby necessitating a return trip to the tool room to obtain another appliance that may or may not be in good operating condition.

Furthermore, and apart from the working time lost in such circumstances, in the case of tools or appliances that have developed a ground leak, considerable danger exists with the possibility of injury to personnel if the person obtaining such a tool uses it on metal work under conditions that may cause the current supplied to the tool to ground through the body of the user which may be in contact with the metal work or a moist or wet area on the floor or other electrically grounded object.

With the foregoing in mind, the present invention has for its principal object the provision of a device that may be employed to test an electrical tool or appliance to detect the existence therein of a short circuit or a ground leak before the tool or appliance is used.

Another object of the present invention is to provide a novel test device of the stated type that may be located at the tool supply room where it is readily available to test a tool or appliance as it is issued and before the workman leaves the tool room and returns to his work station thereby saving considerable time that otherwise might be wasted should the tool or appliance prove to be electrically faulty.

Another object of the present invention is to provide a novel test device having the stated characteristics and features that may be employed to test a tool or appliance before it is used so that the workman is protected from possible injury resulting from the use of an electrically faulty tool or appliance.

A further object of the invention is to provide a novel test device having the described attributes that is fool-proof and efficient in operation and use, and which requires but a few seconds time to determine the electrical condition of the tool or appliance.

Figure 2:
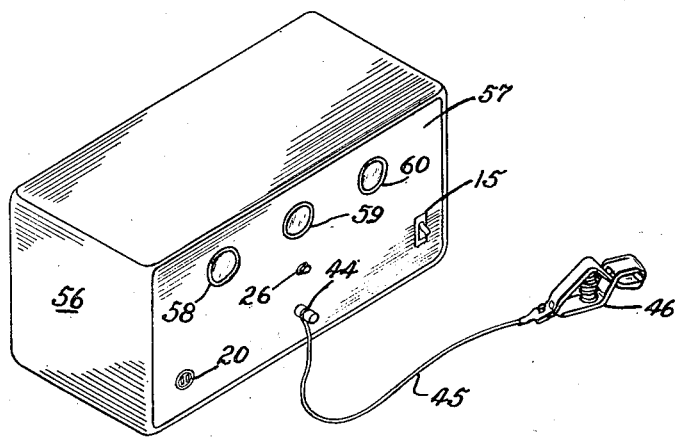

These and other objects of the invention, and the various features and details of the construction, operation and use thereof are hereinafter fully set forth and described with reference to the accompanying drawing, in which:

Fig. 1 is an electrical circuit diagram including the operative elements of a test device embodying the present invention; and Fig. 2 is a view in perspective of one form of test device made according to the invention.

Referring now to the drawing, a test device made according to the present invention for determining the electrical condition of a small portable electric tool or appliance comprises an electrical circuit having input terminals for connection to a suitable source of electrical potential, output terminals for connection to the electrical lead conductor of the tool or appliance to be tested, a connection for a ground lead conductor to the tool, and means for indicating the electrical conditions of the tool together with associated equipment for operating and controlling the indicating means.

With reference more particularly to Fig. 1 of the drawing, reference numeral 10 designates a conventional type of receptacle or socket to receive the usual two-prong plug connector of the cord of electrical tools and appliances. One terminal 11 of the receptacle 10 is connected by conductor 13 to the movable contact arm 14 of a single pole switch 15, for example, of the snap type, having two fixed contacts 16 and 17. The contact 16 of the switch 15 is connected by means of a conductor 18 to one terminal 19 of a suitable source of electrical potential for example, 110 volts alternating current. The other terminal 12 of the receptacle 10 is connected by conductor 20 to the other contact 17 of said switch 15, and this contact 17 in turn is adapted to be connected by a conductor 21 either through a switch 23 and a conductor 24, or through a branch conductor 25, switch 26 and a conductor 27, and through a current limiting resistance 28, to the other terminal 29 of the source of electrical potential by a conductor 30 in which may be included a circuit protective device such as a fuse 31.

The switch 26 is of the push button actuated type comprising a movable contact member 32 and a plurality of fixed contact elements 33, 34, 35, 36 and 37 cooperatively disposed with respect thereto. The contact member 32 is spring biased to the left with respect to Fig. 1 of the drawing, and the several contact elements cooperatively associated therewith are arranged so that normally the said contact member 32 is closed with respect to contacts 36 and 37 and open with respect to the contacts 33, 34 and 35, it being understood that upon actuation of the said contact member 32 against its spring, said member 32 opens with respect to contacts 36 and 37 and engages contacts 33, 34 and 35 to close a circuit therethrough.

The branch conductor 25 and the conductor 27, previously mentioned, are connected respectively to the contact elements 33 and 34 of switch 26, and connected across the line conductors 18 and 21, by means of the branch conductor 25 and a conductor 38, is a suitable indicator device 39 such as, for example, an incandescent lamp of appropriate color such as white, yellow or green. The contacts 35 and 36 of the switch 26 are each connected by a conductor 40 to one terminal of an indicating device 41 which has its other terminal connected by a conductor 42 to the line conductor 18 previously described, and the contact element 37 is connected by a conductor 43 to a terminal 44 to which is connected a lead conductor 45 having a suitable clamp device 46 at its free end for connecting the lead conductor 45 to an external metal part of the tool or appliance to be tested. The indicating device 41 essentially is highly sensitive and responsive to small amounts of current flow therethrough, and for this purpose the device 41 may be a suitable electric meter of the desired sensitivity or a sensitive glow discharge device such as a small neon lamp. The latter is preferred, however, by reason of its greater sensitivity and ability to produce a visible indication of very small amounts of current flow therethrough. It is to be noted that the line conductor 18, to which the ground lead conductor 45 is connected through indicator 41, should be connected to the neutral or grounded side of the input voltage source as indicated.

The switch 23, previously mentioned herein, is of the self-locking relay type comprising a coil 47, a movable contact arm 48 and a pair of fixed contacts 49 and 50. As shown, the coil 47 is connected across the line terminals 18 and 21 by means of conductors 51 and 52, respectively. The line conductor 21 and the conductor 24 are connected respectively to the contact element 49 and the movable contact arm 48 of the relay switch 23, and the construction and arrangement of said switch and its contacts is such that the arm 48 thereof is closed with respect to the contact 50 when coil 47 is deenergized and is closed with respect to the contact element 49 when said coil is energized. The contact element 50 of switch 23 is connected by a conductor 53 to one terminal of an indicating device 54 the other terminal of which is connected by a conductor 55 to the line conductor 18. The indicating device 54 may be of the visible or audible type although, in the illustrated embodiment of the invention, such device is shown as an incandescent lamp that may be, for example, red in color.

From the foregoing it will be observed that when an electrical potential is applied to the input terminals 19 and 29, actuation of the push-button switch 26 to bring the contact member 32 thereof momentarily into engagement with the contacts 33, 34 and 35, as aforesaid, will establish an electric circuit through the resistance 28, and through indicator 39 and coil 47 which are in parallel, thereby energizing said indicator 39 and coil 47. Energization of coil 47 causes the relay contact arm 48 to open with respect to the contact 50 and to close with respect to the contact 49 with the result that a circuit is established through the relay coil 47 that is maintained independently of the switch 26 which thereupon may be released. Continued energization of relay coil 47 in this manner also maintains a circuit through the indicating device 39 which remains energized and serves to indicate that the test device is in condition to proceed to test the tool or appliance. Operation of the push-button switch 26 in the described manner also momentarily closes a circuit through the indicator device 41 thereby energizing the latter only long enough to indicate that it is in operating condition and functioning properly for the test to be conducted.

In operation of the device, and assuming that the tool or appliance to be tested is a portable electric motor driven drill, the usual plug connector of the current supply cord of the tool is inserted into the receptacle 10 in the usual manner, and the clamp 46 of the ground lead cord 45 is secured to an exterior metal part of the tool such as its casing, the drill chuck or drill element. With the tool connected as described to the test device, the push-button switch 26 is momentarily actuated to check the operating condition of the indicator device 41 and also to energize the indicator 39 and relay coil 47. Energization of the coil 47 operates the relay switch 23, as aforesaid, so that the coil 47 and indicator device 39 remain energized after release of the push-button switch 26.

Illumination of the indicator device 39 indicates that the test device is in proper condition to proceed to test the tool, and this is accomplished by actuating the snap switch 15 to close its contact arm 14 with the contact 17. Both terminals 11 and 12 of the receptacle 10, as well as both conductors of the current supply cord and the rotor and stator windings of the tool motor, thus are connected through the relay switch 23 to the line terminal 29. The other line terminal 19 is connected through the conductor 18, indicating device 41, switch 26 and conductor 43, to the terminal 44 and the lead conductor 45 that is grounded to the exterior metal structure of the tool as previously described. It will be observed, therefore, that any current leak to an external metal part of tool existing in the electrical circuit of the tool will cause a current flow through the indicating device 41 thereby causing it to indicate the presence of a ground leak in the tool being tested.

On the other hand, to test for a short circuit in the current supply cord or motor of the tool, the switch 15 is again actuated to close contact arm 14 thereof with the contact 16 so that the tool is connected across both line conductors 18 and 21 of the test device. The operating switch of the tool being tested is now turned to "on" position, and if a short circuit exists in the tool motor or its current supply cord there will result a large current flow across the line conductors that operates to shunt out the coil 47 of the relay switch 23 thereby deenergizing the latter and causing contact arm 48 to open with respect to contact element 49 and close upon contact element 50. Opening of the arm 48 with respect to contact 49 serves to open the line circuit to the tool and through the indicator device 39, and closing of the contact arm 48 upon the other contact 50 operates to connect the indicator device 54 across the line thereby energizing the latter to indicate visibly the existence of a short circuit in the tool being tested. The resistance 28 is of sufficient capacity to absorb and dissipate the momentary surge of current caused by the short circuit and thereby prevent damage to the circuit.

In the event that either a ground leak or a short circuit is found to exist in a tool or appliance, it is returned to the tool crib for repair, and a tool or appliance that is in proper electrical condition is obtained.

As shown in Fig. 2 of the drawing the test device of the present invention may be mounted in an appropriate cabinet 56 having a front or face panel 57 on which may be mounted in suitable positions the receptacle 10, push-button switch 26, ground lead terminal 44 and the snap switch 15. In addition suitable openings or windows 58, 59 and 60 may be provided in the panel 57 through which the indicating devices 39, 45 and 54, respectively, may be observed by the person conducting the test of the tool or appliance.

Summarizing the operation, when the input terminals 19 and 29 are connected to a source of electricity and no tool or appliance is connected, the indicating device 54 is immediately actuated, because the only circuit that is initially completed is that from terminal 19, through line 18, through line 55, through indicator 54, through line 53, contact 50, contact arm 48, line 24 through resistance 28 and line 30, fuse 31 and terminal 29. Then push button switch 26 is momentarily operated. While it is depressed, a circuit is momentarily completed from line 18 through indicator 41, contacts 35 and 32 and 34 of switch 26 to line 27 and resistance 28 to the terminal 29. Simultaneously, a circuit is completed from line 18 through indicator 39, line 38, contacts 33, 32 and 34 of pushbutton switch 26 to line 27 and the terminal 29. At the same time, a parallel circuit is completed from line 18 through line 51, relay winding 47, line 52 and 25 to the same contacts 33, 32 and 34 of push button switch 26 to line 27 and the terminal 29.

The circuit through relay winding 47 moves the relay contact arm 48 from contact 50 to contact 49. This breaks the circuit to indicator 54, which then ceases to operate. However, by this time, all three indicators 29, 41 and 54 have been actuated, thus demonstrating that they are all in working order. When relay 47 has thus been actuated, a new circuit is then formed to it from line 18, line 51, relay 47, line 52, contact 49, contact arm 48 and line 24 to the terminal 29. When the push button has been released, the circuit to indicator 41 is broken but indicator 39 remains energized as it now has a circuit parallel with the relay winding 47, such circuit being by line 38 and line 25 through contact 49 and relay arm 48 to line 24 to terminal 29. To test a tool or appliance, its power line plug is connected to the receptacle 10. Contact arm 14 of switch 15 is set on contact 17 and clamp 46 is attached to any metal part of the tool or appliance. If a ground is present, indicator 41 is actuated, thus making this indicator 41 a ground indicator. If no ground is present, ground indicator 41 remains in the power line of the tool or appliance being tested, inactive. To test for a short, switch 15 is then shifted to place contact arm 14 on contact 16. If a short is present, the surge of current through the short shunts the current away from through relay winding 47, deenergizing it, permitting contact arm 48 to move from contact 49 to contact 50. This breaks the circuit through the power line and through indicator 39, which has stayed in continuous operation to show that the relay 47 was in a state of energization since push button was first depressed, but completes the original circuit through indicator 54, thus making indicator 54 a short indicator. If no short is present, indicator 39 remains energized, and ground indicator 54 is not actuated. The continued operation of the indicator 39 after the test is complete shows that no short is present, thus making it a relay-energization indicator while the ground test is being performed, and a "no short" indicator after the tool has successfully passed the "short" test.

To test for a short in the motor of the appliance or tool being tested, the power switch thereof is then turned to "on" position, and the same action takes place as has just been described in connection with its power line. By following the above procedure, the device first positively indicates that each of the indicators is in operating condition, then it indicates positively the presence or absence of a ground in the tool or appliance being tested, then the presence or absence of a short, first in the power line thereof, then in the motor thereof.

From the foregoing, it will be observed that the present invention provides a novel device for testing electrical tools and appliances to detect the existence therein of a short circuit or ground leak before the tool or appliance is used. The invention also provides a test device of the stated type that may be located at the tool supply rooms or cribs in industrial plants where it is readily available for testing the tool or appliance as it is issued to the workman and before he transports it to his work station, thereby saving considerable time that would be wasted should the tool or appliance prove to be electrically faulty when attempt is made to use it. In addition the device of the invention serves to detect the existence of a ground leak in the tool or appliance thereby protecting the workman from possible injury resulting from the use of a tool that is electrically faulty. The invention furthermore provides a device having the stated attributes that is foolproof and efficient in operation and use, and which requires but a few seconds time to determine the electrical condition of the tool.

While a particular embodiment of the invention has been illustrated and described herein, it is not intended to limit the invention to such disclosure, and changes and modifications may be made in and to the device within the scope of the following claims.

The invention described herein may be manufactured and used by or for the Government of the United States of America for governmental purposes without the payment of any royalties thereon or therefor.

I claim:

1. In a device for detecting and indicating grounds and short circuits in electric tools and appliances, input terminals connectable to a source of electricity, output terminals connectable to the power line to the tool or appliance to be tested, a pair of power circuit lines providing a circuit connecting said input terminals to said output terminals, a switch across said pair of circuit lines adjacent said output terminals operable in one position to connect said output terminals to both lines of said circuit and another position to connect both said output terminals to only one line of said circuit, a ground testing line connectable to a metal part of the tool or appliance being tested, a ground indicator in circuit with the other line of said power circuit lines, a switch in said ground indicator circuit, in normal position, connecting said ground indicator to said ground testing line, a short indicator in circuit between said power circuit lines, a self locking relay, a relay contact arm and contact in said short indicator circuit completing said latter circuit only while said relay is deenergized, three back contacts connectable to each other when said ground indicating switch is actuated to other than said normal position, a circuit from one power circuit line through said relay and two of said back contacts to the other power circuit line, a circuit parallel thereto through said ground indicator, the third back contact and one of the first two back contacts to said other power circuit line, a relay energization indicator in circuit from one power circuit line through said relay contact arm, when in energized position to said other power circuit line, a circuit parallel thereto through said relay and said relay arm, when in energized position, across said power circuit line, said power line circuit between said input and output terminals extending through the relay arm when in energized position, to shunt the circuit from said relay when a short is present in a tool or appliance being tested and deenergize said relay arm to complete the short indicator circuit.

2. In a device for detecting and indicating grounds and short circuits in electric tools and appliances, input terminals connectable to a source of electricity, output terminals connectable to the power line to the tool or appliance to be tested, a pair of power circuit lines providing a circuit connecting said input terminals to said output terminals, a switch across said pair of circuit lines adjacent said output terminals operable in one position to connect said output terminals to both lines of said circuit and another position to connect both said output terminals to only one line of said circuit, a ground testing line connectable to a metal part of the tool or appliance being tested, a ground indicator in circuit with the other line of said power circuit lines, a switch in said ground indicator circuit in normal position, connecting said ground indicator to said ground testing line, a short indicator in circuit between said power circuit lines, a self-locking relay, a relay contact arm and contact in said short indicator circuit completing said latter circuit only while said relay is deenergized, three back contacts connectable to each other when said ground indicating switch is actuated to other than said normal position, a circuit from one power circuit line through said relay and two of said back contacts to the other power circuit line; a circuit parallel thereto through said ground indicator, the third back contact and one of the first two back contacts to said other power circuit line; a relay energization indicator in circuit from one power circuit line through said relay contact arm, when in energized position, to said other power circuit line, a circuit parallel thereto through said relay and said relay arm, when in energized position, across said power circuit line, said power line circuit between said input and output terminals extending through the relay arm when in energized position to shunt the circuit from said relay when a short is present in a tool or appliance being tested and deenergize said relay arm to break the circuit to the tool or appliance being tested and to complete the short indicator circuit, and a resistance in said power circuit between said short indicator and said input terminals to absorb the power surge of a short.

JOSEPH H. KIRKPATRICK, Jr.

REFERENCES CITED

The following references are of record in the file of this patent:

UNITED STATES PATENTS

| Number | Name | Date |
|---|---|---|
| 1,984,493 | Pierce | Dec. 18, 1934 |
| 2,044,546 | Ryan et al. | June 16, 1936 |
| 2,179,901 | Smith | Nov. 14, 1939 |

FOREIGN PATENTS

| Number | Country | Date |
|---|---|---|
| 233,431 | Great Britain | May 8, 1925 |
| 543,660 | Great Britain | Mar. 6, 1942 |